US012190649B2

(12) United States Patent
Nagata et al.

(10) Patent No.: US 12,190,649 B2
(45) Date of Patent: Jan. 7, 2025

(54) PROCESSING APPARATUS FOR AUTONOMOUS VEHICLES UNDERGOING SUSPENSION OF VEHICLE OPERATION

(71) Applicant: TOYOTA JIDOSHA KABUSHIKI KAISHA, Toyota (JP)

(72) Inventors: Yu Nagata, Chofu (JP); Hiroshi Higashide, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 17/805,145

(22) Filed: Jun. 2, 2022

(65) Prior Publication Data

US 2022/0392274 A1 Dec. 8, 2022

(30) Foreign Application Priority Data

Jun. 8, 2021 (JP) ................................ 2021-096129

(51) Int. Cl.

*G08G 1/123* (2006.01)
*G07C 5/00* (2006.01)
*G07C 5/08* (2006.01)
*H04N 7/18* (2006.01)

(52) U.S. Cl.

CPC ............. *G07C 5/008* (2013.01); *G07C 5/006* (2013.01); *G07C 5/0808* (2013.01); *G07C 5/0816* (2013.01)

(58) Field of Classification Search

CPC ...... G07C 5/008; G07C 5/006; G07C 5/0808; G07C 5/0816; G08G 1/123; G08G 1/096725; H04N 7/18

USPC ........................................................ 701/29.3

See application file for complete search history.

(56) References Cited

U.S. PATENT DOCUMENTS

| | | | | |
|---|---|---|---|---|
| 9,754,490 | B2* | 9/2017 | Kentley | G06Q 10/02 |
| 10,699,580 | B1* | 6/2020 | Gross | G05D 1/0022 |
| 11,447,067 | B2* | 9/2022 | Patnaik | G08G 1/166 |
| 2007/0203866 | A1* | 8/2007 | Kidd | G06N 5/025 706/47 |
| 2018/0316764 | A1* | 11/2018 | Ferreira Gomes | G07C 5/02 |
| 2018/0365772 | A1* | 12/2018 | Thompson | G06Q 50/40 |

FOREIGN PATENT DOCUMENTS

| | | | |
|---|---|---|---|
| CN | 101634710 | A * | 1/2010 |
| JP | H09221073 | A * | 8/1997 |
| JP | 2008-181498 | A | 8/2008 |

(Continued)

OTHER PUBLICATIONS

NTIMC (National Traffic Incident Management Coalition), Safe, Quick Clearance, 2014 (Year: 2014).*

*Primary Examiner* — Jelani A Smith
*Assistant Examiner* — George A Alcorn, III
(74) *Attorney, Agent, or Firm* — Sughrue Mion, PLLC

(57) ABSTRACT

An information processing apparatus includes a controller configured to acquire, when a suspension of operation occurs in an autonomous vehicle, positional information, vehicle information, a vehicle internal image, and a vehicle external image of the autonomous vehicle, and determine, in a case in which a suspension of operation occurs in a plurality of autonomous vehicles, an order of priority for a rescue team to go to the plurality of vehicles, based on the positional information, the vehicle information, the vehicle internal image, and the vehicle external image.

1 Claim, 5 Drawing Sheets

(56) References Cited

FOREIGN PATENT DOCUMENTS

| | | | | | |
|---|---|---|---|---|---|
| JP | 2013159428 | A | * | 8/2013 | |
| JP | 2018-060450 | A | | 4/2018 | |
| JP | 2018055535 | A | * | 4/2018 | |
| KR | 10-2015-0052431 | A | | 5/2015 | |
| KR | 20150052431 | A | * | 5/2015 | |
| WO | WO-2016052703 | A1 | * | 4/2016 | ............. A01B 76/00 |
| WO | WO-2019136201 | A1 | * | 7/2019 | |

* cited by examiner

PROCESSING APPARATUS FOR AUTONOMOUS VEHICLES UNDERGOING SUSPENSION OF VEHICLE OPERATION

CROSS-REFERENCE TO RELATED APPLICATION

This application claims priority to Japanese Patent Application No. 2021-096129 filed on Jun. 8, 2021, the entire contents of which are incorporated herein by reference.

TECHNICAL FIELD

The present disclosure relates to an information processing apparatus, a program, and an information processing method.

BACKGROUND

When a suspension of operation occurs in an autonomous vehicle, such as an autonomous bus, due to failure or the like, it is necessary to take action regarding the autonomous vehicle that has stopped operating.

For example, Patent Literature (PTL) 1 discloses a method of changing the operating authority granted to an external operation unit that outputs operating commands to an autonomous vehicle according to a vehicle suspension status when forced braking is activated in the vehicle during unmanned driving.

CITATION LIST

Patent Literature

PTL 1: JP 2018-60450 A

SUMMARY

In a case in which a suspension of operation occurs in a plurality of autonomous vehicles simultaneously, a rescue team preferably responds in an appropriate order of priority to the autonomous vehicles that have stopped operating.

It would be helpful to enable an appropriate determination of the order of priority for response by a rescue team in a case in which a suspension of operation occurs in a plurality of autonomous vehicles.

An information processing apparatus according to the present disclosure includes a controller configured to:

acquire, when a suspension of operation occurs in an autonomous vehicle, positional information, vehicle information, a vehicle internal image, and a vehicle external image of the autonomous vehicle; and determine, in a case in which a suspension of operation occurs in a plurality of autonomous vehicles, an order of priority for a rescue team to go to the plurality of autonomous vehicles, based on the positional information, the vehicle information, the vehicle internal image, and the vehicle external image.

A program according to the present disclosure is configured to cause a computer to execute operations, the operations including:

acquiring, when a suspension of operation occurs in an autonomous vehicle, positional information, vehicle information, a vehicle internal image, and a vehicle external image of the autonomous vehicle; and determining, in a case in which a suspension of operation occurs in a plurality of autonomous vehicles, an order of priority for a rescue team to go to the plurality of autonomous vehicles, based on the positional information, the vehicle information, the vehicle internal image, and the vehicle external image.

An information processing method according to the present disclosure is an information processing method in an information processing apparatus and includes:

acquiring, when a suspension of operation occurs in an autonomous vehicle, positional information, vehicle information, a vehicle internal image, and a vehicle external image of the autonomous vehicle; and determining, in a case in which a suspension of operation occurs in a plurality of autonomous vehicles, an order of priority for a rescue team to go to the plurality of autonomous vehicles, based on the positional information, the vehicle information, the vehicle internal image, and the vehicle external image.

According to the present disclosure, an appropriate determination of the order of priority for response by a rescue team can be made in a case in which a suspension of operation occurs in a plurality of autonomous vehicles.

DETAILED DESCRIPTION

An embodiment of the present disclosure is described below with reference to the drawings.

Figure 1:
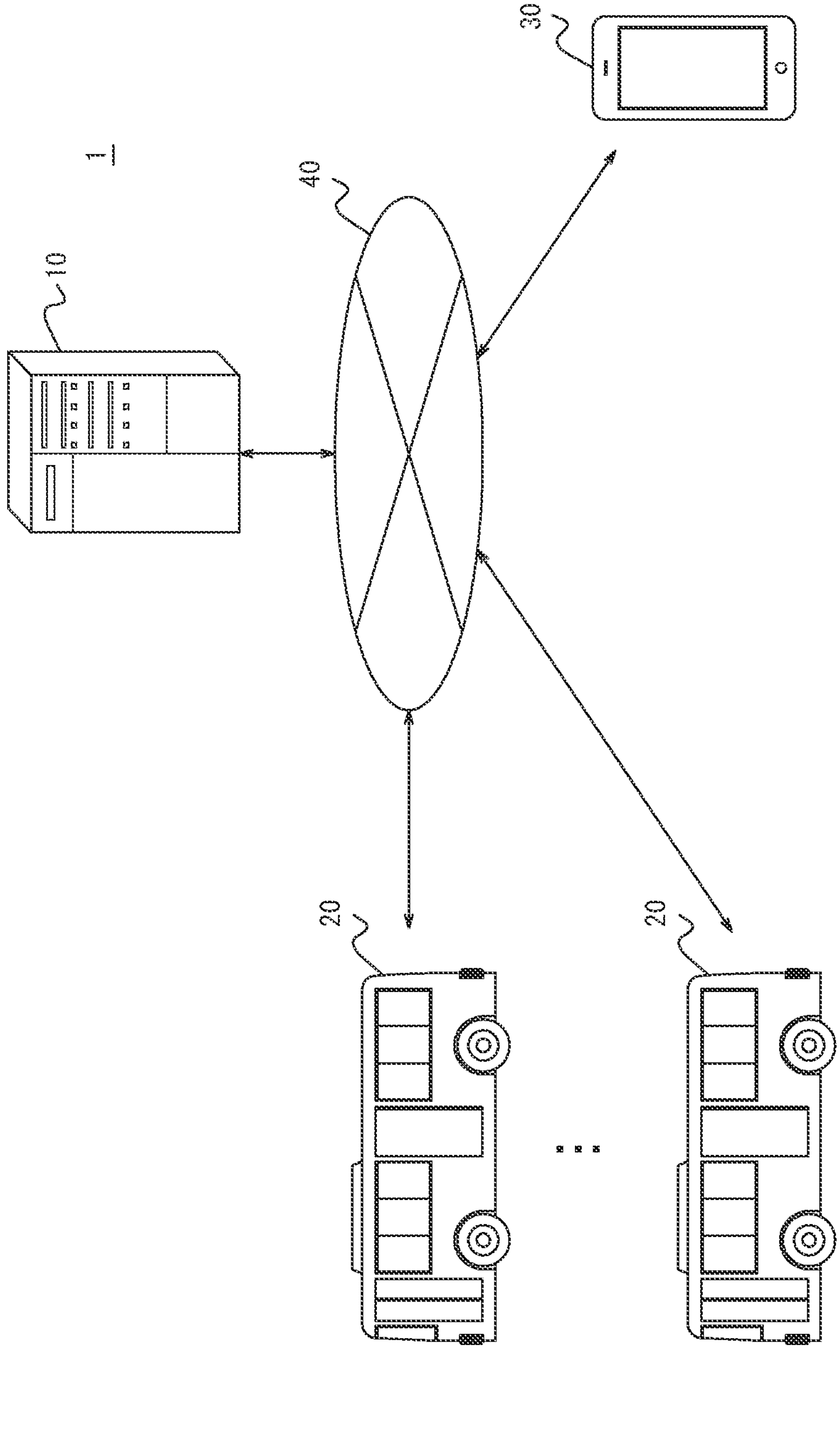
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and outline of the information processing system 1 according to an embodiment of the present disclosure are described with reference to FIG. 1.

The information processing system 1 includes an information processing apparatus 10, a plurality of autonomous vehicles 20, and a terminal apparatus 30. The information processing apparatus 10, the autonomous vehicles 20, and the terminal apparatus 30 are communicably connected via a network 40. The network 40 may be a network including a mobile communication network, the Internet, and the like.

Although one information processing apparatus 10 is illustrated in FIG. 1, the number of information processing apparatuses 10 may be two or greater. A plurality of autonomous vehicles 20 is illustrated in FIG. 1, and the number of autonomous vehicles 20 may be any number two or greater. Also, although one terminal apparatus 30 is illustrated in FIG. 1, the number of terminal apparatuses 30 may be two or greater.

The autonomous vehicle 20 may, for example, be a route bus that operates autonomously, a sightseeing bus that operates autonomously, or the like. The autonomous vehicle 20 may be any type of automobile, such as a gasoline-powered vehicle, a diesel-powered vehicle, an HEV (Hybrid Electric Vehicle), a PHEV (Plug-in Hybrid Electric Vehicle), a BEV (Battery Electric Vehicle), a FCEV (Fuel Cell Electric Vehicle), or the like. Driving of the autonomous vehicle 20 may be automated at any level. The automation level may, for example, be any one of Level 1 to Level 5 according to the level classification defined by the Society of Automotive Engineers (SAE).

The terminal apparatus 30 is a terminal apparatus owned by a rescue team. When a suspension of operation occurs in an autonomous vehicle 20 due to failure or the like, the rescue team can respond to the autonomous vehicle 20 that has stopped operating and address the cause of the suspension of operation.

The terminal apparatus 30 may be a terminal apparatus kept by the rescue team or a terminal apparatus installed in a building of an organization to which the rescue team belongs.

The rescue team can take necessary action depending on the cause of the suspension of operation of the autonomous vehicle 20. For example, in a case in which a suspension of operation occurs in the autonomous vehicle 20 due to failure, the rescue team repairs the autonomous vehicle 20. For example, in a case in which the failure of the autonomous vehicle 20 is not easily repairable, the rescue team moves the autonomous vehicle 20 to a repair shop or other such location using a tow truck or the like. For example, in a case in which the autonomous vehicle 20 has stopped operating to respond to a suddenly ill passenger, the rescue team treats, transports, etc. the suddenly ill passenger.

When a suspension of operation occurs in an autonomous vehicle 20, the information processing apparatus 10 acquires positional information, vehicle information, vehicle internal images, and vehicle external images of the autonomous vehicle 20 from the autonomous vehicle 20 that has stopped operating. In a case in which a suspension of operation occurs in a plurality of autonomous vehicles 20, the information processing apparatus 10 determines an order of priority for the rescue team to go to the plurality of autonomous vehicles 20 based on the positional information, the vehicle information, the vehicle internal image, and the vehicle external image acquired from each autonomous vehicle 20. The information processing apparatus 10 transmits information on the determined order of priority to the terminal apparatus 30 of the rescue team.

The rescue team can go to the plurality of autonomous vehicles 20 that have stopped operating based on the received order of priority.

The information processing apparatus 10 can communicate with the autonomous vehicle 20 and the terminal apparatus 30 via the network 40. The information processing apparatus 10 is, for example, a dedicated computer configured to function as a server. The information processing apparatus 10 may be a general purpose personal computer (PC).

The autonomous vehicle 20 can communicate with the information processing apparatus 10 via the network 40.

The terminal apparatus 30 can communicate with the information processing apparatus 10 via the network 40. The terminal apparatus 30 may, for example, be a smartphone, a tablet, or a general purpose PC.

Figure 2:
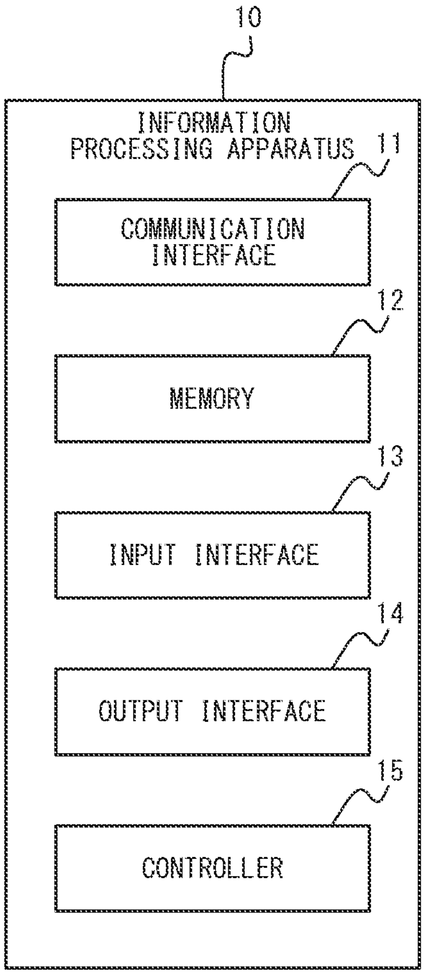
FIG. 2 is a block diagram illustrating a configuration of an information processing apparatus according to an embodiment of the present disclosure.

A configuration of the information processing apparatus 10 according to an embodiment of the present disclosure is described with reference to FIG. 2.

The information processing apparatus 10 includes a communication interface 11, a memory 12, an input interface 13, an output interface 14, and a controller 15.

The communication interface 11 includes a communication module connected to the network 40. For example, the communication interface 11 may include a communication module corresponding to a local area network (LAN). In an embodiment, the information processing apparatus 10 is connected to the network 40 via the communication interface 11. The communication interface 11 transmits and receives various information via the network 40. The communication interface 11 can communicate with the autonomous vehicle 20 and the terminal apparatus 30 via the network 40.

The memory 12 is, for example, a semiconductor memory, a magnetic memory, an optical memory, or the like, but is not limited to these. The memory 12 may function as, for example, a main memory, an auxiliary memory, or a cache memory. The memory 12 stores any information used for operations of the information processing apparatus 10. For example, the memory 12 may store a system program, an application program, various types of information received by the communication interface 11, and the like. The information stored in the memory 12 may be updated with information received from the network 40 via the communication interface 11, for example. A portion of the memory 12 may be installed externally to the information processing apparatus 10. In this case, the externally installed portion of the memory 12 may be connected to the information processing apparatus 10 via any appropriate interface.

The input interface 13 includes one or more input interfaces for detecting user input and acquiring input information based on user operation. For example, the input interface 13 includes, but is not limited to, a physical key, a capacitive key, a touch screen integrally provided with a display of the output interface 14, or a microphone that receives audio input.

The output interface 14 includes one or more output interfaces for outputting information to notify the user. For example, the output interface 14 includes, but is not limited to, a display for outputting information as images, a speaker for outputting information as audio, or the like.

The controller 15 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 15 executes processes related to operations of the information processing apparatus 10 while controlling components of the information processing apparatus 10.

Figure 3:
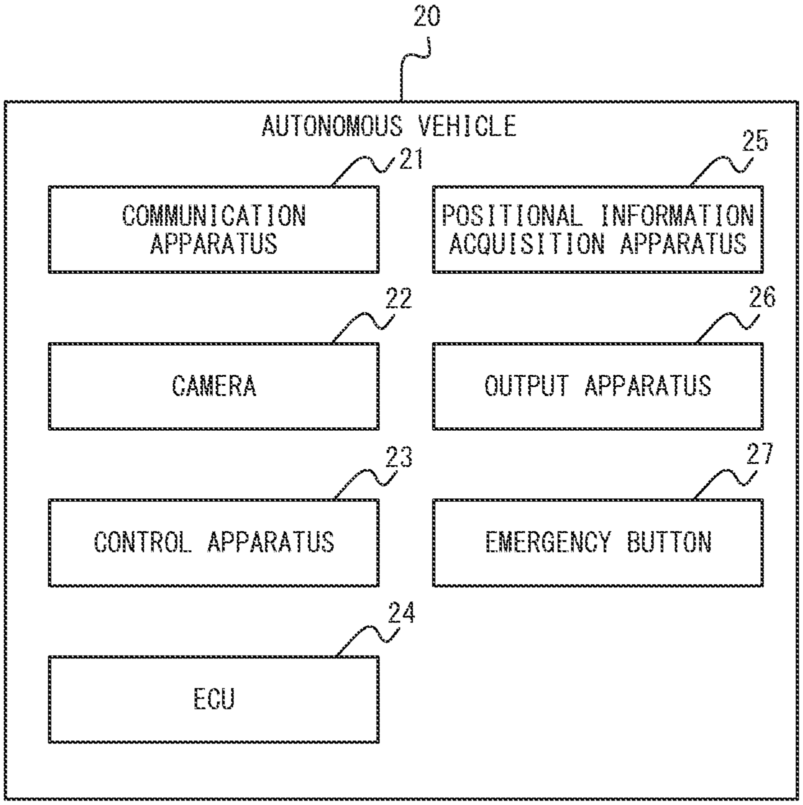
FIG. 3 is a block diagram illustrating a configuration of an autonomous vehicle according to an embodiment of the present disclosure.

A configuration of the autonomous vehicle 20 according to an embodiment of the present disclosure is described with reference to FIG. 3.

The autonomous vehicle 20 includes a communication apparatus 21, a camera 22, a control apparatus 23, an electronic control unit (ECU) 24, a positional information acquisition apparatus 25, an output apparatus 26, and an emergency button 27. The communication apparatus 21, the camera 22, the control apparatus 23, the ECU 24, the positional information acquisition apparatus 25, the output apparatus 26, and the emergency button 27 are communicably connected via an in-vehicle network, such as a Controller Area Network (CAN), or dedicated lines, for example.

The communication apparatus 21 includes a communication module that connects to the network 40. For example, the communication apparatus 21 may include a communication module compliant with a mobile communication standard such as LTE, 4G, and 5G. The autonomous vehicle 20 is connected to the network 40 via the communication apparatus 21. The communication apparatus 21 transmits and receives various information via the network 40. The communication apparatus 21 can communicate with the information processing apparatus 10 via the network 40.

The camera 22 is mounted on the autonomous vehicle 20. The camera 22 can capture internal and external images of the autonomous vehicle 20. Although only one camera 22 is illustrated in FIG. 3, a plurality of cameras 22 may be mounted on the autonomous vehicle 20. In a case in which a plurality of cameras 22 is mounted on the autonomous vehicle 20, a camera 22 that captures vehicle internal images and a camera 22 that captures vehicle external images may be mounted on the autonomous vehicle 20.

The control apparatus 23 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The control apparatus 23 executes processes related to operations of the autonomous vehicle 20 while controlling components of the autonomous vehicle 20.

The ECU 24 collects various types of vehicle information relating to the autonomous vehicle 20 from various sensors mounted in the autonomous vehicle 20. The ECU 24 outputs the collected vehicle information to the control apparatus 23. The vehicle information collected by the ECU 24 may, for example, include information that enables a determination of the type of failure of the autonomous vehicle 20, and information that enables a determination of the degree of failure of the autonomous vehicle 20. The vehicle information collected by the ECU 24 may include information such as speed data, acceleration data, and positional data. Although one ECU 24 is illustrated in FIG. 1, a plurality of ECUs 24 may be mounted in the autonomous vehicle 20.

The positional information acquisition apparatus 25 includes one or more receivers compliant with any appropriate satellite positioning system. For example, the positional information acquisition apparatus 25 may include a GPS receiver. The positional information acquisition apparatus 25 acquires the measured position of the autonomous vehicle 20 as positional information. The positional information includes, for example, an address, a latitude, a longitude, an altitude, and the like.

The output apparatus 26 includes one or more output interfaces for outputting information to notify passengers in the autonomous vehicle 20. For example, the output apparatus 26 includes, but is not limited to, a display for outputting information as images, a speaker for outputting information as audio, or the like.

The emergency button 27 is a button capable of notifying the information processing apparatus 10 that a suspension of operation has occurred in the autonomous vehicle 20. The emergency button 27 is located in the interior of the autonomous vehicle 20.

Figure 4:
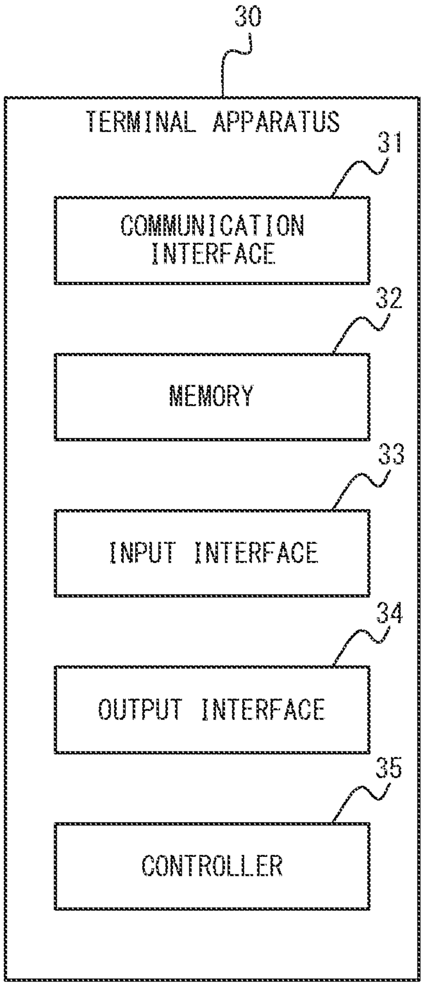
FIG. 4 is a block diagram illustrating a configuration of a terminal apparatus according to an embodiment of the present disclosure.

A configuration of the terminal apparatus 30 according to an embodiment of the present disclosure is described with reference to FIG. 4.

The terminal apparatus 30 includes a communication interface 31, a memory 32, an input interface 33, an output interface 34, and a controller 35.

The communication interface 31 includes a communication module connected to the network 40. For example, the communication interface 31 may include a communication module compliant with mobile communication standards such as LTE, 4G and 5G. In an embodiment, the terminal apparatus 30 connects to the network 40 via the communication interface 31. The communication interface 31 transmits and receives various information via the network 40. The communication interface 31 can communicate with the information processing apparatus 10 via the network 40.

The memory 32 is, for example, a semiconductor memory, a magnetic memory, an optical memory, or the like, but is not limited to these. The memory 32 may function as, for example, a main memory, an auxiliary memory, or a cache memory. The memory 32 stores any information used for operations of the terminal apparatus 30. For example, the memory 32 may store a system program, an application program, various types of information received by the communication interface 31, and the like. The information stored in the memory 32 may be updated with information received from the network 40 via the communication interface 31, for example. A portion of the memory 32 may be installed externally to the terminal apparatus 30. In this case, the externally installed portion of the memory 32 may be connected to the terminal apparatus 30 via any appropriate interface.

The input interface 33 includes one or more input interfaces for detecting user input and acquiring input information based on user operation. The input interface 33 is, for example, a physical key, a capacitive key, a touch screen integrally provided with a display of the output interface 34, a microphone for receiving audio input, or the like, but is not limited to these.

The output interface 34 includes one or more output interfaces for outputting information to notify the user. For example, the output interface 34 includes, but is not limited to, a display for outputting information as images, a speaker for outputting information as audio, or the like.

The controller 35 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 35 executes processes related to operations of the terminal apparatus 30 while controlling components of the terminal apparatus 30.

(Operations of Information Processing System)

Operations of the information processing system 1 illustrated in FIG. 1 are described with reference to FIGS. 1 to 4.

As described above, the autonomous vehicle 20 is, for example, a route bus that operates autonomously, a sightseeing bus that operates autonomously, or the like.

The positional information acquisition apparatus 25 of the autonomous vehicle 20 continuously acquires positional information for the autonomous vehicle 20. The control apparatus 23 transmits the positional information for the autonomous vehicle 20 acquired by the positional information acquisition apparatus 25 to the information processing apparatus 10 via the communication apparatus 21. The control apparatus 23 may transmit the positional information for the autonomous vehicle 20 to the information processing apparatus 10 at predetermined time intervals, for example.

The ECU 24 of the autonomous vehicle 20 continuously collects vehicle information for the autonomous vehicle 20. The vehicle information includes, for example, information that enables a determination of the type of failure of the autonomous vehicle 20, and information that enables a determination of the degree of failure of the autonomous vehicle 20. The control apparatus 23 transmits the vehicle information for the autonomous vehicle 20 collected by the ECU 24 to the information processing apparatus 10 via the communication apparatus 21. The control apparatus 23 may transmit the vehicle information for the autonomous vehicle 20 to the information processing apparatus 10 at predetermined time intervals, for example.

The camera 22 of the autonomous vehicle 20 continuously captures vehicle internal images and vehicle external images of the autonomous vehicle 20. The control apparatus 23 transmits the vehicle internal images and the vehicle external images of the autonomous vehicle 20 captured by the camera 22 to the information processing apparatus 10 via the communication apparatus 21. The control apparatus 23 may transmit the vehicle internal images and the vehicle external images of the autonomous vehicle 20 to the information processing apparatus 10 at predetermined time intervals, for example.

The communication interface 11 of the information processing apparatus 10 receives the positional information, vehicle information, vehicle internal images, and vehicle external images of the autonomous vehicle 20 transmitted by the autonomous vehicle 20. The controller 15 acquires the positional information, vehicle information, vehicle internal images, and vehicle external images of the autonomous vehicle 20 via the communication interface 11. The controller 15 stores the acquired positional information, vehicle information, vehicle internal images, and vehicle external images of the autonomous vehicle 20 in the memory 12.

When a suspension of operation occurs in the autonomous vehicle 20, the controller 15 acquires the positional information, vehicle information, vehicle internal images, and vehicle external images of the autonomous vehicle 20 at that time from the memory 12. The controller 15 may, for example, acquire the positional information, vehicle information, vehicle internal images, and vehicle external images for a predetermined period of time before and after the time at which it is determined that a suspension of operation has occurred in the autonomous vehicle 20. The controller 15 may, for example, acquire the positional information, vehicle information, vehicle internal images, and vehicle external images of the autonomous vehicle 20 for 15 seconds before and after the time at which it is determined that a suspension of operation has occurred in the autonomous vehicle 20.

The controller 15 may determine that a suspension of operation has occurred in the autonomous vehicle 20 by, for example, the emergency button 27 being pressed in the autonomous vehicle 20. When the emergency button 27 is pressed, the control apparatus 23 of the autonomous vehicle 20 transmits information indicating that the emergency button 27 has been pressed to the information processing apparatus 10 via the communication apparatus 21.

Alternatively, the controller 15 may determine that a suspension of operation has occurred in the autonomous vehicle 20 based on the vehicle information for the autonomous vehicle 20 acquired from the autonomous vehicle 20. The controller 15 may instead determine that a suspension of operation has occurred in the autonomous vehicle 20 based on a report from a crew member, a passenger, or the like on board the autonomous vehicle 20.

In a case in which the controller 15 determines that a suspension of operation has occurred in the autonomous vehicle 20, the controller 15 determines the order of priority for a rescue team to go to the plurality of autonomous vehicles 20, based on the positional information, the vehicle information, the vehicle internal images, and the vehicle external images of each autonomous vehicle 20 received from each autonomous vehicle 20.

The controller 15 transmits information on the determined order of priority to the terminal apparatus 30 of the rescue team via the communication interface 11. At this time, the controller 15 transmits the positional information for each autonomous vehicle 20, together with the information on the determined order of priority, to the terminal apparatus 30 of the rescue team via the communication interface 11. The controller 15 may also transmit the vehicle information, vehicle internal images, and vehicle external images of each autonomous vehicle 20 to the terminal apparatus 30 of the rescue team via the communication interface 11.

The communication interface 31 of the terminal apparatus 30 receives the information on the order of priority transmitted by the information processing apparatus 10. The controller 35 acquires the information on the order of priority via the communication interface 31. The controller 35 uses the output interface 34 to output the acquired information on the order of priority.

The rescue team can confirm the information on the order of priority outputted by the output interface 34 and go to the autonomous vehicles 20 that have stopped operating based on the confirmed order of priority.

<Determination of Order of Priority by Number of Passengers>

The controller 15 may determine the order of priority for the rescue team to go to the plurality of autonomous vehicles 20 based on the number of passengers in the autonomous vehicles 20.

The controller 15 determines the number of passengers in the autonomous vehicle 20 based on the vehicle internal image acquired from the autonomous vehicle 20. The controller 15 may, for example, determine the number of passengers in the autonomous vehicle 20 by performing image analysis on the vehicle internal image.

In a case in which the controller 15 determines that a suspension of operation has occurred in a plurality of autonomous vehicles 20, the controller 15 determines the order of priority for the rescue team to go to the plurality of autonomous vehicles 20 so that an autonomous vehicle with a larger number of passengers has higher priority.

In this way, by a higher priority being given to the autonomous vehicle 20 with a larger number of passengers, the rescue team can respond while prioritizing the autonomous vehicle 20 with a large number of passengers.

<Determination of Order of Priority by Road Width>

The controller 15 may determine the order of priority for the rescue team to go to the plurality of autonomous vehicles 20 based on the width of the road on which the autonomous vehicles 20 are stopped due to the suspension of operation.

The controller 15 determines the width of the road on which the autonomous vehicle 20 is stopped based on the positional information and/or the vehicle external image acquired from the autonomous vehicle 20. The controller 15 may, for example, determine the width of the road on which the autonomous vehicle 20 is stopped by comparing the positional information acquired from the autonomous vehicle 20 with road information stored by the memory 12. Alternatively, the controller 15 may determine the width of the road on which the autonomous vehicle 20 is stopped by, for example, performing image analysis on the vehicle external image acquired from the autonomous vehicle 20.

In a case in which the controller 15 determines that a suspension of operation has occurred in a plurality of autonomous vehicles 20, the controller 15 determines the order of priority for the rescue team to go to the plurality of autonomous vehicles 20 so that an autonomous vehicle 20 stopped on a road with a narrower width has higher priority.

In this way, by a higher priority being given to the autonomous vehicle 20 stopped on a road with a narrower width, the rescue team can respond while prioritizing the autonomous vehicle 20 stopped at a location that significantly affects driving of other vehicles.

<Determination of Order of Priority By Lane Type>

The controller 15 may determine the order of priority for the rescue team to go to the plurality of autonomous vehicles 20 based on the type of lane in which the autonomous vehicles 20 are stopped due to the suspension of operation.

The controller 15 determines the type of lane in which the autonomous vehicle 20 is stopped based on the positional information and/or the vehicle external image acquired from the autonomous vehicle 20. The controller 15 may, for example, determine the type of lane in which the autonomous vehicle 20 is stopped by comparing the positional information acquired from the autonomous vehicle 20 with road information stored by the memory 12. Alternatively, the controller 15 may determine the type of lane in which the autonomous vehicle 20 is stopped by, for example, performing image analysis on the vehicle external image acquired from the autonomous vehicle 20.

In a case in which the controller 15 determines that a suspension of operation has occurred in a plurality of autonomous vehicles 20, the controller 15 determines the order of priority for the rescue team to go to the plurality of autonomous vehicles 20 so that an autonomous vehicle 20 stopped in a passing lane has higher priority than an autonomous vehicle 20 stopped in a non-passing lane.

In this way, by a higher priority being given to the autonomous vehicle 20 stopped in a passing lane, the rescue team can respond while prioritizing the autonomous vehicle 20 stopped at a location that significantly affects driving of other vehicles.

<Determination of Order of Priority By Failure Type>

The controller 15 may determine the order of priority for the rescue team to go to the plurality of autonomous vehicles 20 based on the type of failure of the autonomous vehicles 20.

The controller 15 determines the type of failure of the autonomous vehicle 20 based on the vehicle information acquired from the autonomous vehicle 20.

In a case in which the controller 15 determines that a suspension of operation has occurred in a plurality of autonomous vehicles 20, the controller 15 determines the order of priority for the rescue team to go to the plurality of autonomous vehicles 20 so that an autonomous vehicle 20 for which the type of failure is related to a driving function has higher priority. A failure related to a driving function is, for example, a failure related to the functions of traveling, turning, stopping, or the like of the autonomous vehicle 20.

In this way, by a higher priority being given to the autonomous vehicle 20 for which the type of failure is related to a driving function, the rescue team can respond while prioritizing the autonomous vehicle 20 that is experiencing a serious failure related to traveling, turning, stopping, or the like.

<Determination of Order of Priority by Time Required to Repair Failure>

The controller 15 may determine the order of priority for the rescue team to go to the plurality of autonomous vehicles 20 based on the time required to repair the failure of the autonomous vehicles 20.

The controller 15 estimates the time required to repair the failure of the autonomous vehicle 20 based on the vehicle information acquired from the autonomous vehicle 20.

In a case in which the controller 15 determines that a suspension of operation has occurred in a plurality of autonomous vehicles 20, the controller 15 determines the order of priority for the rescue team to go to the plurality of autonomous vehicles 20 so that an autonomous vehicle 20 with a short time required to repair the failure has higher priority.

In this way, by a higher priority being given to the autonomous vehicle 20 with a short time required to repair the failure, the rescue team can respond while prioritizing the autonomous vehicle 20 that can be restored in a short time.

<Determination of Order of Priority Using Weighting>

The controller 15 may calculate a priority index for determining the order of priority by multiplying by a weighting factor for each of the number of passengers, the road width, the lane type, the failure type, and the time required to repair the fault, and adding the results of the multiplication.

The controller 15 determines the order of priority for the rescue team to go to the plurality of autonomous vehicles 20 so that an autonomous vehicle 20 with a larger priority index has higher priority.

In this way, by a higher priority being given to the autonomous vehicle 20 with a larger priority index, the rescue team can respond while prioritizing the autonomous vehicle 20 with high priority based on a comprehensive evaluation of a plurality of indices.

In the above example, the controller 15 calculates the priority index based on the number of passengers, the road width, the lane type, the failure type, and the time required to repair the failure, but the controller 15 need not calculate the priority index based on all of these factors. For example, the controller 15 may select some of the following indices to calculate the priority index: the number of passengers, the road width, the lane type, the failure type, and the time required to repair the failure.

<Display of Estimated Time of Arrival of Rescue Team>

When transmitting the information on the order of priority to the terminal apparatus 30, the controller 15 of the information processing apparatus 10 may estimate the expected arrival time of the rescue team to each autonomous vehicle 20 and transmit the estimated expected arrival time to the autonomous vehicles 20 via the communication interface 11.

Upon acquiring, via the communication apparatus 21, the estimated arrival time transmitted by the information processing apparatus 10, the control apparatus 23 of the autonomous vehicle 20 uses the output apparatus 26 to output the estimated arrival time.

This enables the passengers in the autonomous vehicle 20 to predict the time at which the rescue team will arrive.

<Dispatch of Doctor>

In a case in which the controller 15 of the information processing apparatus 10 acquires information from a crew member or a passenger of the autonomous vehicle 20 that the cause of the suspension of operation is that a passenger has become suddenly ill, the controller 15 may transmit information to a terminal apparatus of a doctor located near the autonomous vehicle 20 requesting that the doctor go to the autonomous vehicle 20. The positional information for the doctor may be stored by the memory 12.

<Control During Suspension of Operation>

In a case in which the autonomous vehicle 20 stops operating, the control apparatus 23 of the autonomous vehicle 20 may control the doors of the autonomous vehicle 20 to be openable and closable manually. This enables the passengers in the autonomous vehicle 20 to open the doors manually and exit.

In a case in which the autonomous vehicle 20 stops operating at a dangerous location, such as a railroad crossing, the control apparatus 23 of the autonomous vehicle 20 may use the output apparatus 26 to output a message urging to exit the vehicle and evacuate.

Figure 5:
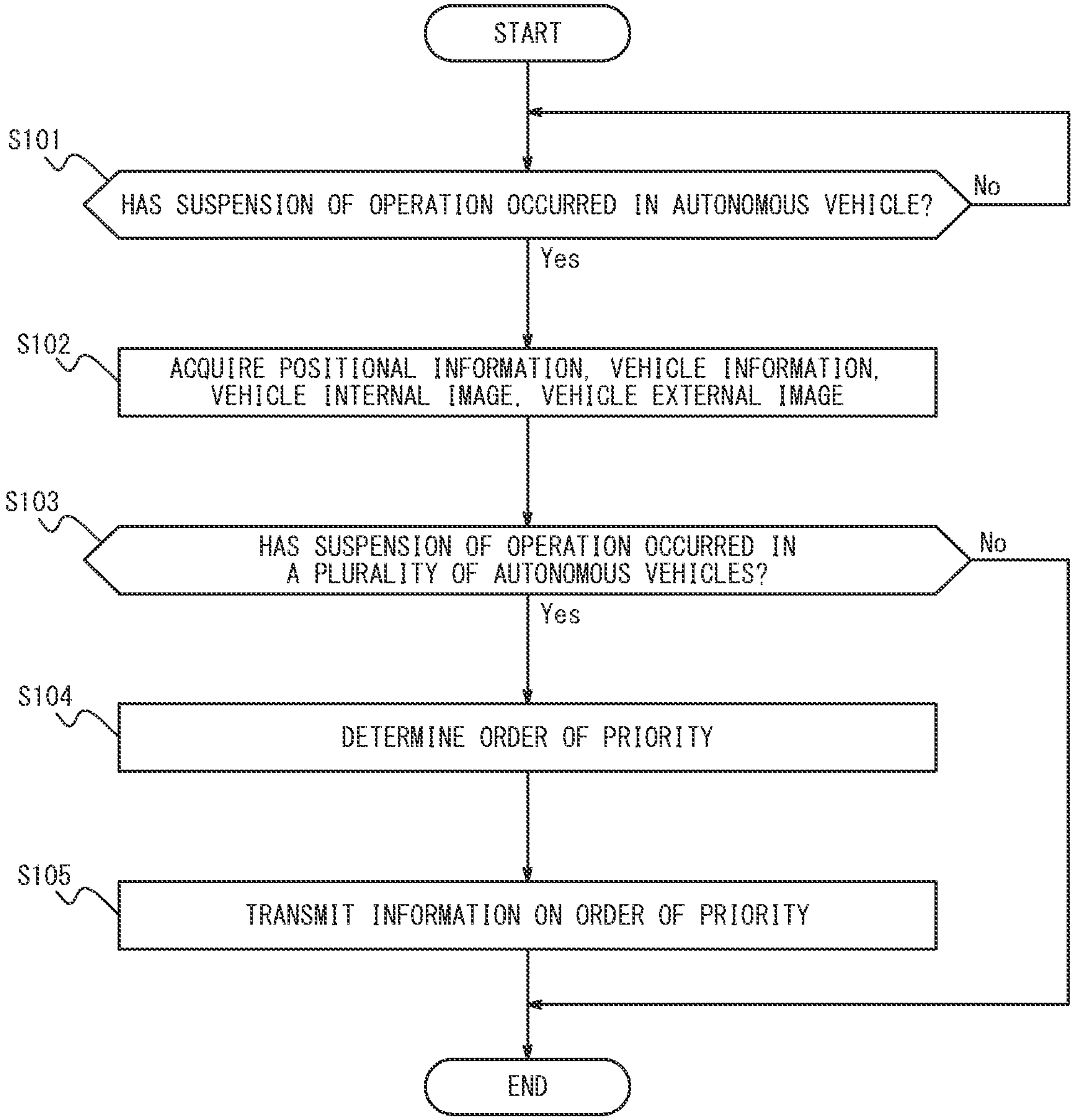
FIG. 5 is a flowchart illustrating operations of an information processing system according to an embodiment of the present disclosure.

Operations of the information processing system 1 are described with reference to the flowchart in FIG. 5.

In step S101, the controller 15 of the information processing apparatus 10 continuously determines whether a suspension of operation has occurred in the autonomous vehicle 20.

In a case in which it is not determined that a suspension of operation has occurred in the autonomous vehicle 20 (step S101: No), the controller 15 repeats the process of step S101. In a case in which it is determined that a suspension of operation has occurred in the autonomous vehicle 20 (step S101: Yes), the controller 15 proceeds to step S102.

In step S102, the controller 15 acquires positional information, vehicle information, vehicle internal images, and vehicle external images of the autonomous vehicle 20 for when the suspension of operation occurred in the autonomous vehicle 20.

In step S103, the controller 15 determines whether a suspension of operation has occurred in a plurality of autonomous vehicles 20.

In a case in which it is not determined that a suspension of operation has occurred in a plurality of autonomous vehicles 20 (step S103: No), the controller 15 ends the process without determining the order of priority. In a case in which it is determined that a suspension of operation has occurred in a plurality of autonomous vehicles 20 (step S103: Yes), the controller 15 proceeds to step S104.

In step S104, the controller 15 determines the order of priority for the rescue team to go to the plurality of autonomous vehicles 20, based on the positional information, the vehicle information, the vehicle internal images, and the vehicle external images of each autonomous vehicle 20 acquired from each autonomous vehicle 20.

In step S105, the controller 15 transmits information on the determined order of priority to the terminal apparatus 30 of the rescue team via the communication interface 11.

As described above, in the information processing apparatus 10 according to the present embodiment, the controller 15 acquires, when a suspension of operation occurs in an autonomous vehicle 20, the positional information, vehicle information, vehicle internal image, and vehicle external image of the autonomous vehicle 20. In a case in which a suspension of operation occurs in a plurality of autonomous vehicles 20, the controller 15 then determines the order of priority for the rescue team to go to the plurality of autonomous vehicles 20 based on the positional information, the vehicle information, the vehicle internal image, and the vehicle external image. This enables the rescue team to go in an appropriate order of priority to the autonomous vehicles 20 that have stopped operating. Therefore, according to the information processing apparatus 10 of the present disclosure, an appropriate determination of the order of priority for response by a rescue team can be made in a case in which a suspension of operation occurs in a plurality of autonomous vehicles 20.

The present disclosure is not limited to the above embodiment. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, some of the processing operations executed in the information processing apparatus 10 in the above embodiment may be executed in the autonomous vehicle 20 or the terminal apparatus 30. For example, some of the processing operations executed in the autonomous vehicle 20 or the terminal apparatus 30 in the above embodiment may be executed in the information processing apparatus 10.

For example, a configuration that causes a general purpose electronic device such as a smartphone, a computer, or the like to function as the information processing apparatus 10 according to the embodiment described above is possible. Specifically, a program in which processes for realizing the functions of the information processing apparatus 10 or the like according to the embodiment are written may be stored in a memory of the electronic device, and the program may be read and executed by a processor of the electronic device. Accordingly, in an embodiment, the present disclosure can also be implemented as a program executable by a processor.

For example, the case of the autonomous vehicle 20 being a route bus or a sightseeing bus has been described as an example in the above embodiment, but the autonomous vehicle 20 may be any type of vehicle.

For example, the case of the number of passengers in the autonomous vehicle 20 being determined by image analysis of the vehicle internal image has been described in the above embodiment, but when the vehicle information includes information on the degree of sinking of the suspension, the number of passengers in the autonomous vehicle 20 may be determined based on the degree of sinking of the suspension.

The invention claimed is:

1. An information processing system comprising:

a server that includes a controller and a memory; and a plurality of autonomous vehicles that communicate with the server via a network, wherein each of the plurality of autonomous vehicles include:

a global position satellite (GPS) receiver configured to obtain positional information of an autonomous vehicle, including a latitude and a longitude of the autonomous vehicle, that is transmitted to the server at predetermined intervals and saved in the memory;

an emergency button located in an interior of the autonomous vehicle configured to be executed by a user in the autonomous vehicle to notify the server that a suspension of operation has occurred in the autonomous vehicle; and a camera configured to obtain a vehicle internal image and a vehicle external image of the autonomous vehicle that is transmitted to the server at predetermined intervals and saved in the memory, wherein the controller of the server is configured to:

determine that more than one of the plurality of autonomous vehicles has a suspension of operation when the emergency button has been executed in more than one of the plurality of autonomous vehicles, based upon a condition that the emergency button has been executed, control the doors of the autonomous vehicles to be openable and closable manually in order to allow the passengers in the autonomous vehicles to open the doors manually and exit, acquire from the memory positional information, vehicle information, and the vehicle internal image, and the vehicle external image of each of the autonomous vehicles; and perform an image analysis on each vehicle internal image to obtain a number of passengers in each of the autonomous vehicles;

determine a width of a road on which each of the autonomous vehicles is stopped based on the positional information and the vehicle external image;

determine a type of lane in which each of the autonomous vehicles is stopped based on the positional information and the vehicle external image;

determine a type of failure of each of the autonomous vehicles based on the vehicle information;

estimate a time required to repair a failure of each of the autonomous vehicles based on the vehicle information;

based upon the condition that the emergency button has been executed in more than one of the plurality of autonomous vehicles, calculate a priority index for each of the autonomous vehicles by multiplying a weighting factor for each of: the number of passengers, the width of the road, the type of lane, the type of failure, and the time required to repair the failure; and transmit to a terminal apparatus of a rescue team, via the network, an order of priority for the autonomous vehicles based on the priority index.

* * * * *